United States Patent
Miller et al.

(10) Patent No.: US 8,504,249 B2
(45) Date of Patent: Aug. 6, 2013

(54) AUTOMATIC CONTROL OF MECHANICAL FRONT WHEEL DRIVE USING SPEED RATIO

(75) Inventors: Jeffrey D. Miller, Dubuque, IA (US); Dennis P. Reiter, Dubuque, IA (US); Bruce A. Musmaker, Asbury, IA (US); Elizabeth H. Steenbergen, Fairborn, OH (US)

(73) Assignee: Deere & Company, Moline, IL (US)

( * ) Notice: Subject to any disclaimer, the term of this patent is extended or adjusted under 35 U.S.C. 154(b) by 545 days.

(21) Appl. No.: 12/602,506

(22) PCT Filed: Jun. 1, 2007

(86) PCT No.: PCT/US2007/012963
§ 371 (c)(1),
(2), (4) Date: May 19, 2010

(87) PCT Pub. No.: WO2008/147363
PCT Pub. Date: Dec. 4, 2008

(65) Prior Publication Data
US 2010/0222975 A1 Sep. 2, 2010

(51) Int. Cl.
*B60K 17/34* (2006.01)
*B60K 23/08* (2006.01)

(52) U.S. Cl.
USPC .............................. 701/50; 701/69

(58) Field of Classification Search
USPC .................. 701/50, 69; 180/244; 192/220
See application file for complete search history.

(56) References Cited

U.S. PATENT DOCUMENTS

| 4,456,108 A | * | 6/1984 | Kageyama | 192/220 |
|---|---|---|---|---|
| 4,747,462 A | * | 5/1988 | Herrmann et al. | 180/233 |
| 4,878,559 A | * | 11/1989 | Moon et al. | 180/244 |
| 4,951,775 A | * | 8/1990 | Kittle et al. | 180/244 |
| 6,513,399 B2 | | 2/2003 | Lamela | |

FOREIGN PATENT DOCUMENTS

| DE | 2503097 A1 | * | 8/1975 |
|---|---|---|---|
| DE | 2946477 A1 | * | 4/1981 |
| GB | 2208217 A | * | 3/1989 |
| JP | 60064035 A | * | 4/1985 |
| JP | 60076475 A | * | 4/1985 |
| JP | 61207218 A | * | 9/1986 |
| JP | 61268570 A | * | 11/1986 |
| JP | 01004539 A | * | 1/1989 |
| JP | 2001277880 A | * | 10/2001 |
| JP | 2006335230 A | * | 12/2006 |

OTHER PUBLICATIONS

EPO machine translation of DE 2503097.*
EPO machine translation of FR 2467750 (corresponds to DE 2946477).*
EPO machine translation of DE 2503097 (original DE document published Aug. 28, 1975).*
EPO machine translation of FR 2467750 (corresponds to DE 2946477, original DE document published Apr. 30, 1981).*
Notification of Transmittal of the International Search Report of the Declaration, International Search Report, and Written Opinion of the International Searching Authority for International Stage of Present Application (Nov. 6, 2007)(7 pages).
Background Information (1 page).

* cited by examiner

*Primary Examiner* — Mary Cheung
*Assistant Examiner* — David Testardi (57) ABSTRACT

A work vehicle includes a mechanical front wheel drive (MFWD) and a controller unit for automatically controlling the MFWD based at least on a MFWD request signal, a speed ratio request signal, and a brake-status signal. The MFWD request is overridden if the speed ratio request is for a predetermined speed ratio (such as fourth gear), and the overriding of the MFWD request is interrupted if the brake-status signal indicates that a brake of the work vehicle is applied.

8 Claims, 8 Drawing Sheets

AUTOMATIC CONTROL OF MECHANICAL FRONT WHEEL DRIVE USING SPEED RATIO

FIELD OF THE DISCLOSURE

The present disclosure relates to control of a mechanical front-wheel drive.

BACKGROUND OF THE DISCLOSURE

There are work vehicles, such as, for example, backhoe loaders, which have a mechanical front wheel drive (abbreviated herein as MFWD). As used herein, a "MFWD" is a front wheel drive that is mechanically operable by a transmission of the vehicle via a clutch in order to activate the MFWD (i.e., MFWD mechanically connected to the transmission output) and deactivate the MFWD (i.e., mechanically disconnected from the transmission output).

The MFWD may be activated, for example, when ground conditions or a particular task calls for additional traction, i.e., in addition to the traction provided by a mechanical rear wheel drive (abbreviated MRWD) also mechanically operable by the transmission via, for example, another clutch. In other words, the MFWD may be activated to obtain rear-wheel drive and front-wheel drive operation in order to transfer power to both the rear wheels and the front wheels. On the other hand, MFWD may be deactivated to revert to rear-wheel drive only operation in order to transfer power to only the rear wheels.

SUMMARY OF THE DISCLOSURE

According to an aspect of the present disclosure, there is provided a work vehicle comprising a MFWD, a MFWD input device, a shifter, and an electrical controller unit. The MFWD input device is operable to generate a MFWD request signal representative of a MFWD request for activation or deactivation of the MFWD. The shifter is operable to generate a speed-ratio request signal representative of a speed-ratio request for a speed ratio among a plurality of speed ratios in which the work vehicle is capable of operating. The electrical controller unit communicates with the MFWD switch and the shifter, and is adapted to: receive the MFWD request signal and the speed-ratio request signal, determine if the MFWD request is for activation of the MFWD using the MFWD request signal and if the speed-ratio request is for a predetermined speed ratio of the plurality of speed ratios using the speed-ratio request signal, and, if both conditions are met, command deactivation of the MFWD, thereby overriding the MFWD request for activation.

Such an override scheme may be particularly useful where the predetermined speed ratio is a transport speed ratio (e.g., fourth forward gear). Exemplarily, the work vehicle may be capable of operating in a plurality of speed ratios comprising at least one working speed ratio (e.g., first and second forward gears) and at least one transport speed ratio (e.g., third and fourth forward gears) higher than the at least one working speed ratio. Activation of the MFWD while the work vehicle is operating in one of the higher transport speed ratios could result in vehicle speed reduction due to front drive axle windage losses and tire scrubbing. By contrast, automatic deactivation of the MFWD while the work vehicle is operating in one of the higher transport speed ratios may maximize vehicle speed and useful tire life, such as in instances where the operator may have forgotten to deactivate the MFWD.

Override of the MFWD activation request may be interrupted in instances when a brake of the vehicle is applied during, for example, operation of the vehicle in one of the transport speed ratios. In other words, when the brake is applied during operation of the vehicle in such a transport speed ratio, the controller unit commands activation of the MFWD, rather than deactivation, in order to achieve rear-wheel and front-wheel braking. Typically, there is a brake for each of the two rear wheels. When MFWD is activated, braking of the rear wheels by the respective, two rear brakes causes the two front wheels to experience braking as well due to the mechanical connection between the MRWD and MFWD, resulting in four-wheel braking. Such four-wheel braking is more effective than two-wheel braking, especially at higher vehicle speeds.

According to another aspect of the present disclosure, the work vehicle may be configured to automatically activate the MFWD when a brake is applied depending on the speed ratio requested for the vehicle (regardless whether there is a separate request for MFWD activation by the MFWD input device). In such a case, the work vehicle comprises the MFWD, a brake, a brake sensor for sensing application of the brake and generating a brake-status signal in response thereto, the shifter, and an electrical controller unit that communicates with the brake sensor and the shifter. The electrical controller unit is adapted to: receive the brake-status signal and the speed-ratio request signal, determine if the brake is applied using the brake-status signal and if the speed-ratio request is for a predetermined speed ratio of the plurality of speed ratios using the speed-ratio request signal, and, if both conditions are met, command activation of the MFWD.

Similar to the discussion above, such activation of the MFWD is particularly useful when the vehicle is operating in one of its higher transport speed ratios (e.g., third or fourth forward gear). Exemplarily, brake activation of the MFWD would occur only when the vehicle is in a transport speed ratio.

There are known systems which activate the MFWD automatically upon brake application regardless of the speed ratio of the vehicle. It is believed that some operators may tap the brakes simply to activate the MFWD, even when braking is not needed, as a shortcut to requesting MFWD activation by operation of a separate MFWD switch, resulting in premature brake wear. By contrast, the control scheme of the present disclosure would consider the speed ratio of the vehicle before activating the MFWD upon brake application. The operator would thus not be able to tap the brakes at just any speed ratio for the purpose of obtaining MFWD activation. It is believed that the number of unnecessary brake applications may thereby be reduced, enhancing brake life.

The above and other features will become apparent from the following description and the attached drawings.

BRIEF DESCRIPTION OF THE DRAWINGS

The detailed description of the drawings refers to the accompanying figures in which.

DESCRIPTION OF THE DRAWINGS

Figure 1:
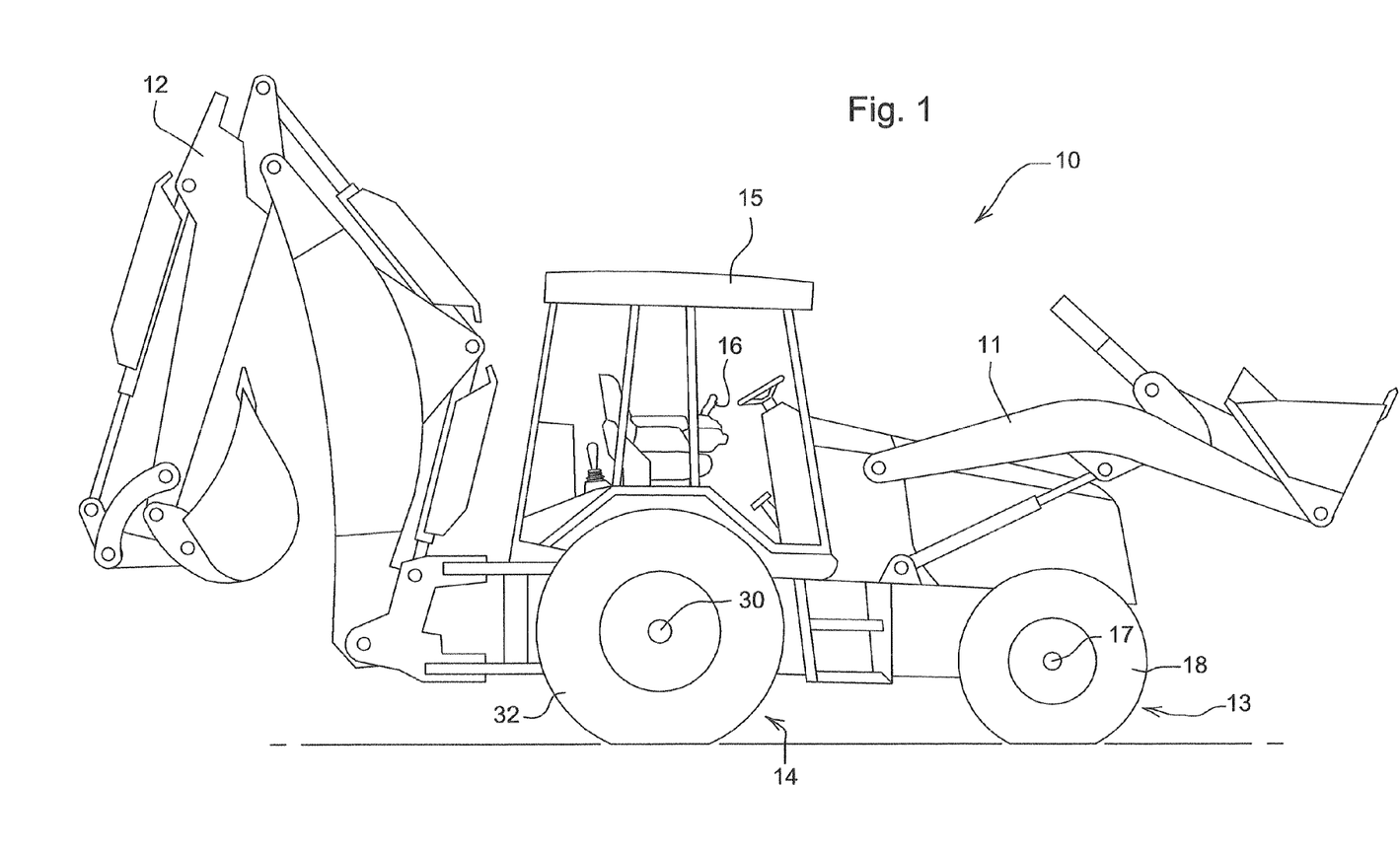
FIG. 1 is side elevation view of a work vehicle, in the form of, for example, a backhoe loader.
Figure 2:
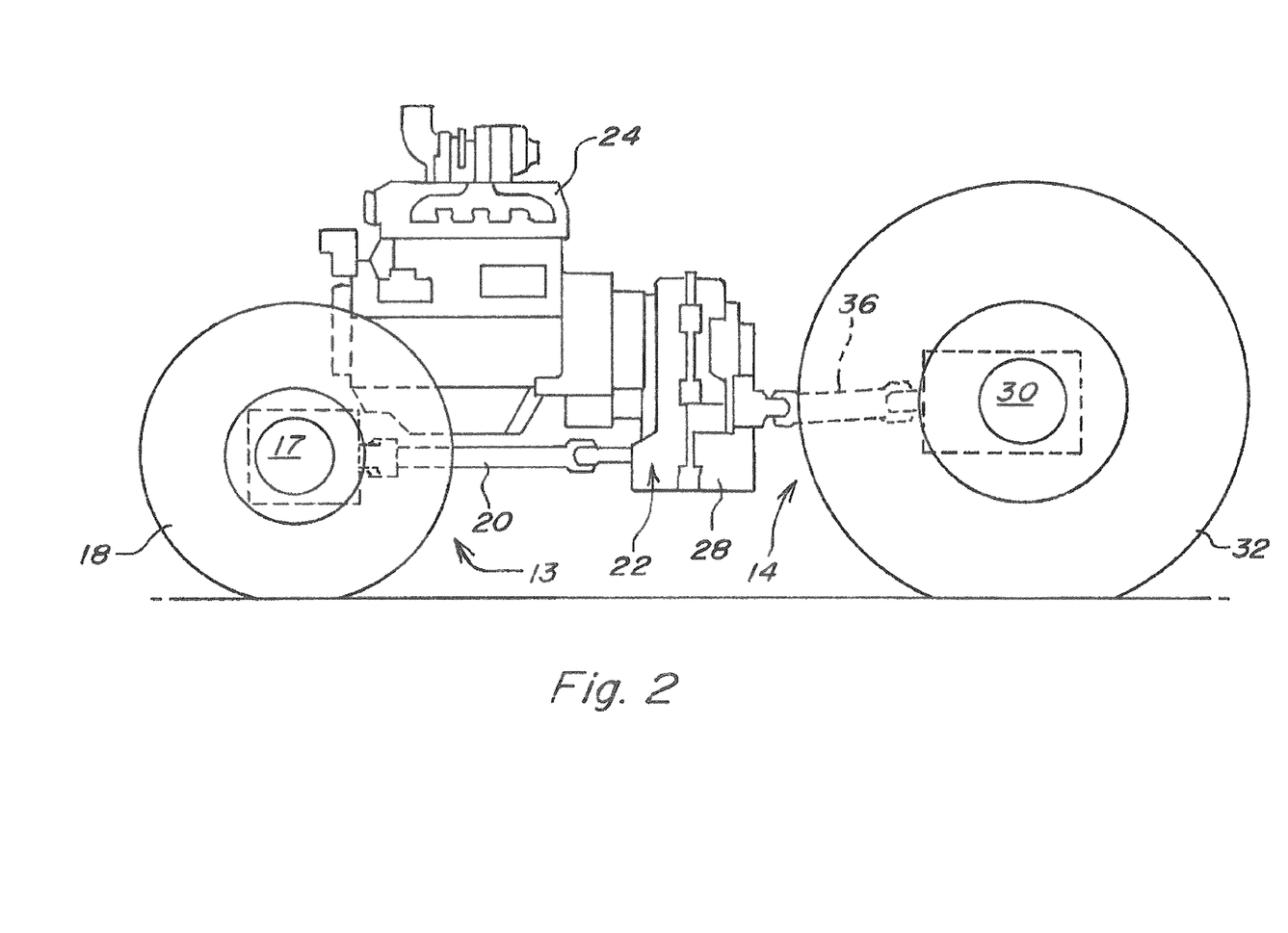
FIG. 2 is a side elevation view of the drivetrain of the work vehicle with a MFWD.
Figure 3:
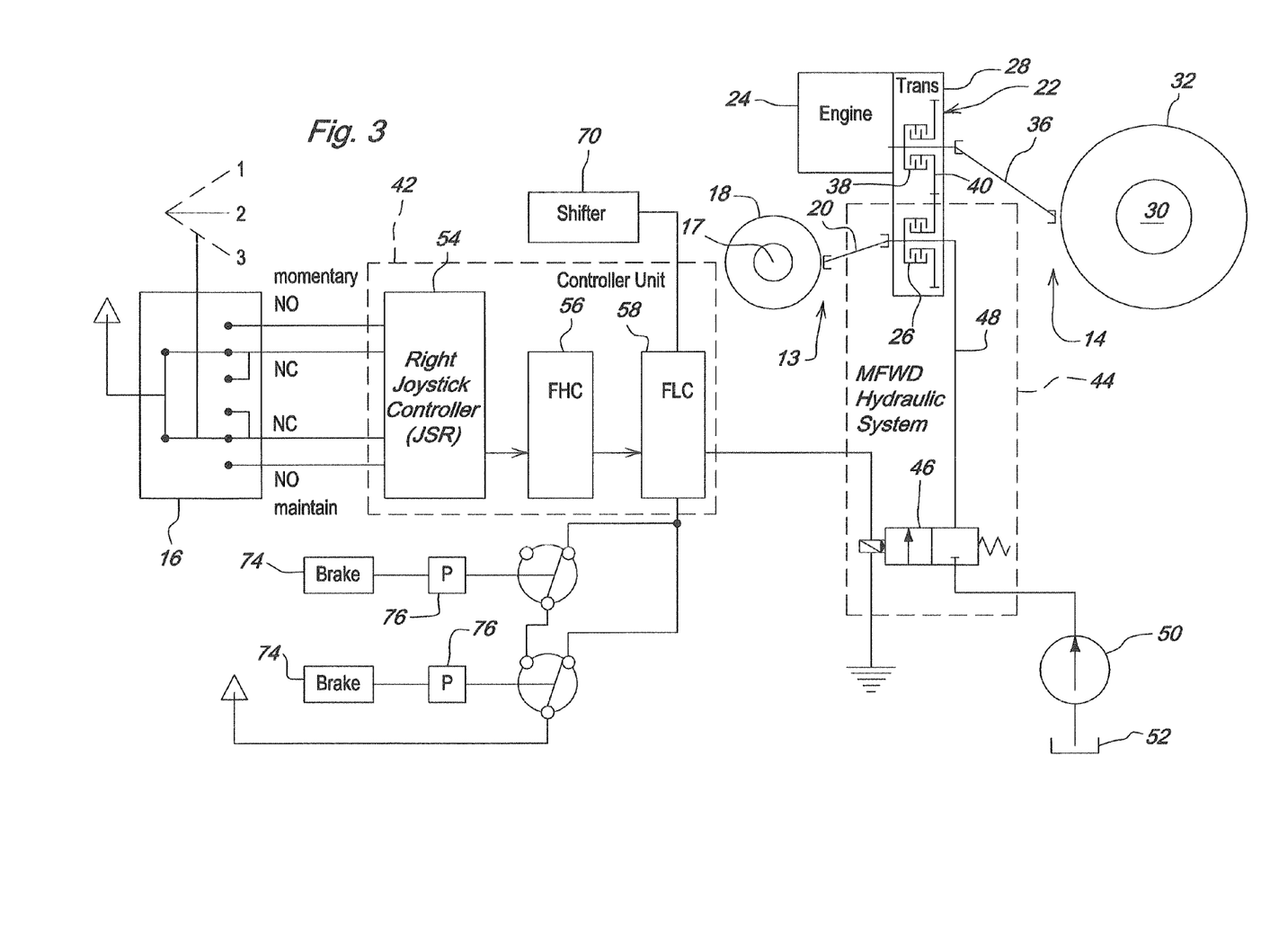
FIG. 3 is a simplified diagrammatic view showing a control system for the MFWD, including a MFWD switch for activating and deactivating the MFWD.

Referring to FIGS. 1-3 together, there is shown a work vehicle 10, such as, for example, a backhoe loader with a loader portion 11 and a backhoe portion 12. Exemplarily, the vehicle 10 has a MFWD 13 and MRWD 14. An operator in the operator's station 15 may operate a MFWD switch 16 or other MFWD input device to activate and deactivate the MFWD 13, as discussed in more detail below.

Illustratively, the MFWD 13 has a front drive axle 17, front wheels 18 (e.g., two) connected to opposite ends of the front drive axle 17, and a front drive shaft 20 connected to the front drive axle 17 and operable by a transmission 22, powered by an engine 24, via a front drive clutch 26 within the transmission housing 28.

Further illustratively, the MRWD 14 has a rear drive axle 30, rear wheels 32 (e.g., two) connected to opposite ends of the rear drive axle 34, and a rear drive shaft 36 connected to the rear drive axle 34 and operable by the transmission 22 via a rear drive clutch 38 (or set of clutches) within the transmission housing 28.

The clutches 26, 38 may be connected by gearing 40 in the transmission 22 such that disengagement of the clutch 38 deactivates the MRWD 14 and the MFWD 13 and engagement of the clutch 38 activates the MRWD 14 and enables activation of the MFWD 13 upon engagement of the clutch 26. Disengagement of the clutch 26 can also deactivate the MFWD 13.

Referring to FIG. 3, the operator may operate the MFWD switch 16 to activate and deactivate the MFWD 13. Exemplarily, the MFWD switch 16 has a momentary-ON position for momentarily activating the MFWD 13. The operator may thus actuate the momentary feature of the MFWD switch 16 so as to convert the vehicle 10 from rear-wheel drive operation using only the MRWD 14 to rear-wheel and front-wheel drive operation using both the MFWD 13 and the MRWD 16. The vehicle 10 reverts back to rear-wheel drive operation upon release of the MFWD switch 16 from its momentary-ON position.

The MFWD switch 16 may be, for example, a 3-position switch, illustratively a 3-position rocker switch. The MFWD switch 16 comprises the momentary-ON position 1 (see also FIG. 5A), a maintain-OFF position 2 for continuously deactivating the MFWD 13 (e.g., a center maintain-OFF position in the 3-position rocker switch example) (see also FIG. 5B), and a maintain-ON position 3 for continuously activating the MFWD (see also FIG. 5C). Unlike the momentary feature, in the maintain-ON and maintain-OFF positions, the MFWD switch 16 is configured to remain in such positions (e.g., by a respective detent) even after the operator has released the switch 16. Such a switch 16 would offer the operator two options for activating the MFWD 13 (i.e., a momentary option and a maintain or continuous option), allowing the operator to choose which option is desired given personal preferences, current ground conditions, and/or current use of the work vehicle, to name just a few possible factors that may be pertinent to the operator.

An electrical controller unit 42 communicates with the MFWD switch 16 and a MFWD hydraulic system 44. Such communication occurs electrically, such as, for example, either via wiring or wirelessly. The MFWD hydraulic system 44 comprises, for example, an electro-hydraulic valve 46 in the form of, for example, a solenoid valve (e.g., normally closed), the MFWD clutch 26, and a hydraulic line 48 connecting the electro-hydraulic valve 46 and the MFWD clutch 26.

Figure 6:
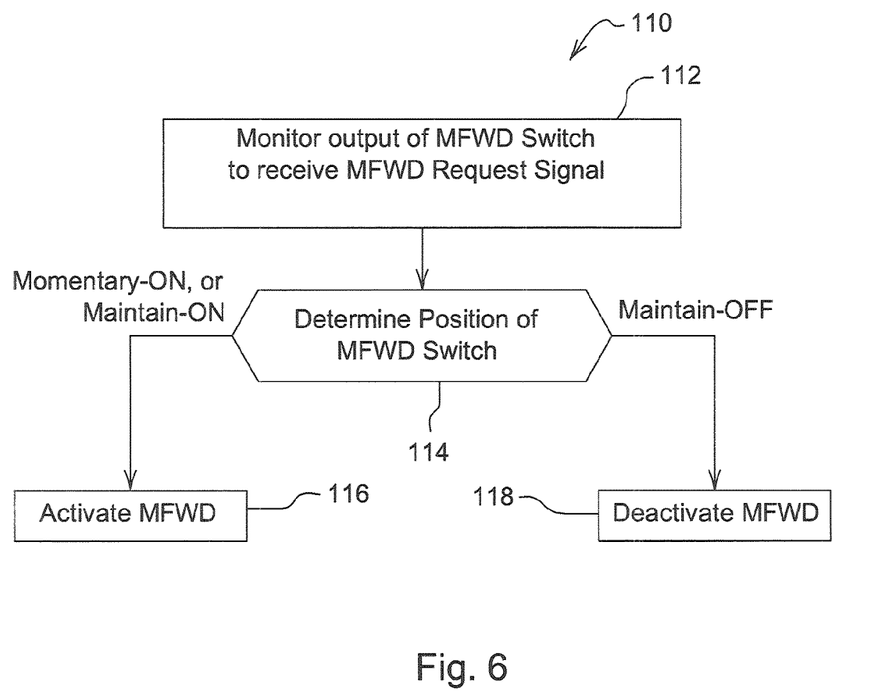
FIG. 6 is a simplified block diagram of a control scheme.

Referring to FIG. 3 and FIG. 6 together, according to a control scheme 110, in act 112, the controller unit 42 monitors output of the MFWD switch 16 and receives a MFWD request signal representative of a request for activation or deactivation of the MFWD 13. In act 114, the controller unit 42 determines from that signal the position of the MFWD switch 16. If the MFWD switch 16 is positioned in its momentary-ON position or its maintain-ON position, in act 116, the controller unit 42 commands the MFWD hydraulic system 44 to activate the MFWD 13. To do so, the controller unit 42 outputs an activate-MFWD control signal to the valve 46 energizing and thus opening the valve 46 so as to allow flow of hydraulic fluid from a pump 50, supplied by a tank 52, to the clutch 26 thereby activating the MFWD 13.

If the MFWD switch 16 is positioned in its maintain-OFF position, in act 118, the controller unit 42 commands the MFWD hydraulic system 44 to deactivate the MFWD 13. This is accomplished by ceasing output of the activate-MFWD control signal so as to de-energize the valve 46. In particular, when de-energized, the valve 46 reverts to its normally closed position, blocking flow of hydraulic fluid from the pump 50 to the clutch 26 so as to disengage the clutch 26 thereby deactivating the MFWD 13.

The controller unit 42 may have one or more electronic controllers. Each controller has a processor and a memory electrically coupled to the processor and having instructions stored therein which, when executed by the processor, causes the processor to perform each of the various function(s) of the controller.

Illustratively, by way of example, the controller unit 42 may include three controllers: a right joystick controller 54, a FHC 56 (Flex Hydraulic Controller), and a FLC 58 (Flex Load Controller). The right joystick controller 54 may be used because, as discussed in more detail below, the MFWD switch 16 may be mounted on the right joystick in the operator's station 15. In such a case, the controller 54 monitors output of the switch 16, receives the MFWD request signal therefrom, and determines from that signal the position of the switch 16, i.e., whether the switch 16 is in the momentary-ON position, the maintain-ON position, or the maintain-OFF position.

The controller 54 then sends a signal representative of the switch position to the FHC 56 to notify the FHC 56 of the position of switch 16. This signal may be in the form of a CAN message over a first CAN bus.

If the switch 16 is positioned in either the momentary-ON position or the maintain-ON position, the FHC 56, in turn, sends a signal to the FLC 58 commanding the FLC to energize the valve 46. This signal may be in the form of a CAN message over a second CAN bus. If the FLC 58 is so commanded, the FLC 58 sends a signal to the valve 46 so as to energize and open the valve 46 for activation of the MFWD 13. If the switch 16 is positioned in its maintain-OFF position, the FLC 58 will not command the FLC 58 to energize the valve 46.

Figure 4:
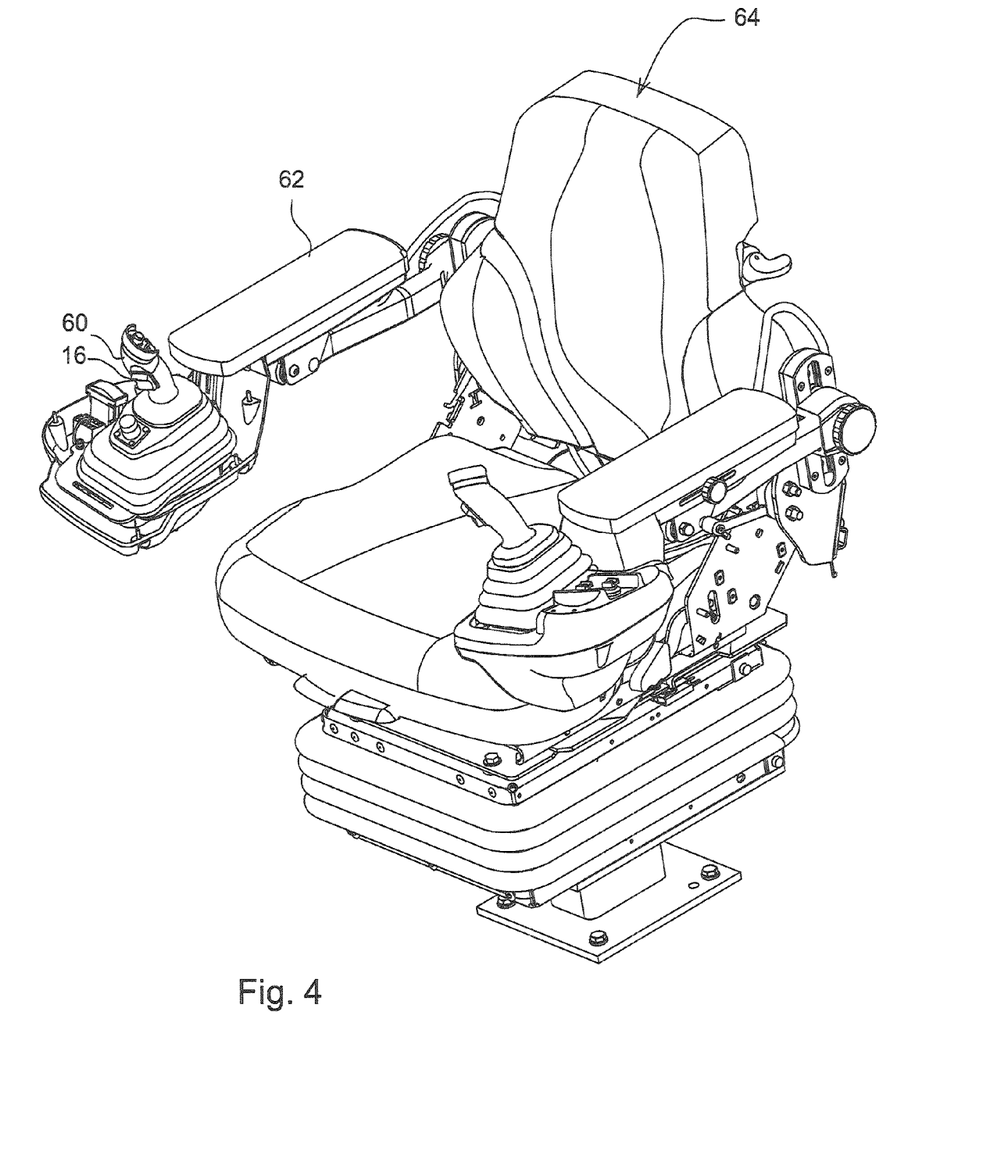
FIG. 4 is a perspective view of the interior of an operator's station of the work vehicle showing the MFWD switch mounted on a joystick (e.g., the right joystick)
Figure 5A:
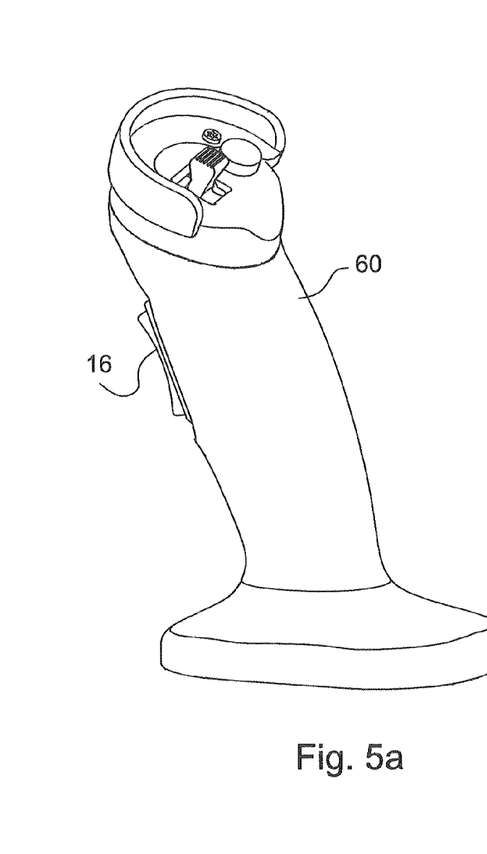
FIG. 5A is a perspective view showing the MFWD switch positioned in a center maintain-OFF position for continuously deactivating the MFWD.
Figure 5B:
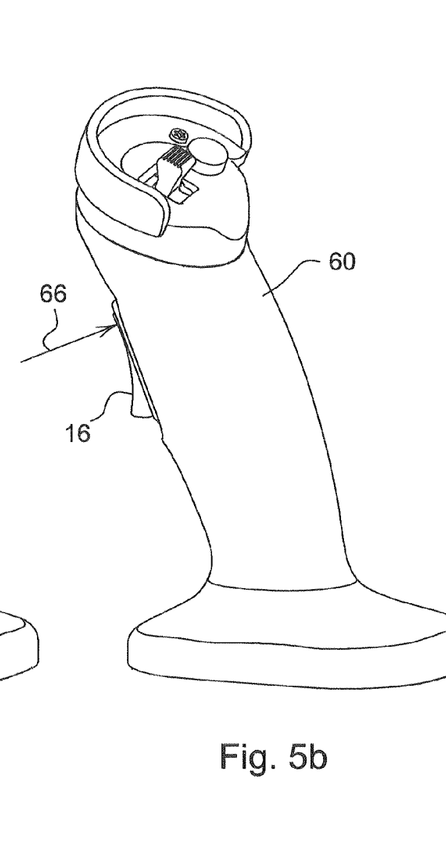
FIG. 5B is a perspective view showing the MFWD switch positioned in a momentary-ON position by exertion of an external force thereon for momentarily activating the MFWD.
Figure 5C:
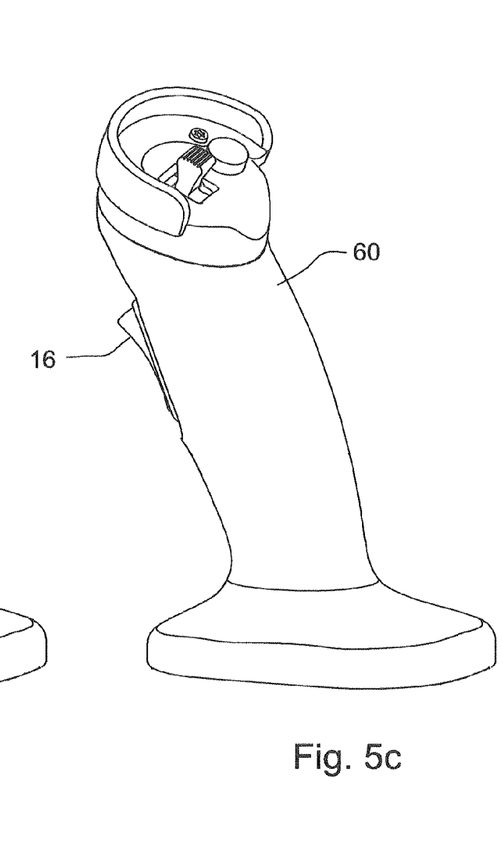
FIG. 5C is a perspective view showing the MFWD switch positioned in a maintain-ON position for continuously activating the MFWD switch.

Referring to FIGS. 4-5C, the MFWD switch 16 may be mounted on a joystick in the operator's station 15 for ready access to the switch 16 by the operator's hand gripping the joystick. Exemplarily, the switch 16 may be mounted on the right joystick 60. The right joystick 60 is, in turn, mounted on the right armrest 62 of the operator's seat 64 for rotation with the seat 64 between forward and rearward positions, exemplarily to control the loader and backhoe portions 11, 12 of the vehicle 10, respectively.

In the backhoe loader example, the right joystick 60 is the loader joystick, responsible for control of the loader portion 11. Mounting of the switch 16 on the loader joystick makes the switch 16 particularly readily accessible to the operator when the operator operates the loader portion 11, such as during digging into a pile. It is to be understood that the switch 16 may be mounted in a wide variety of other locations, including, without limitation, the left joystick, etc.

Referring to FIGS. 5A-5C, the switch 16 is shown as a 3-position rocker switch mounted on the joystick 60 in the various positions of the switch 16. In FIG. 5A, the switch 16 is positioned in its center maintain-OFF position. In FIG. 5B, the switch 16 is positioned in its momentary-ON position by an external force 66. In FIG. 5C, the switch 16 is positioned in its maintain-ON position without requiring continuous application of an external force. As shown in these views, the switch 16 is, for example, oriented longitudinally with the joystick 60 such that the momentary-ON position is located closer to the top of the joystick than the maintain-ON position.

Figure 7A:
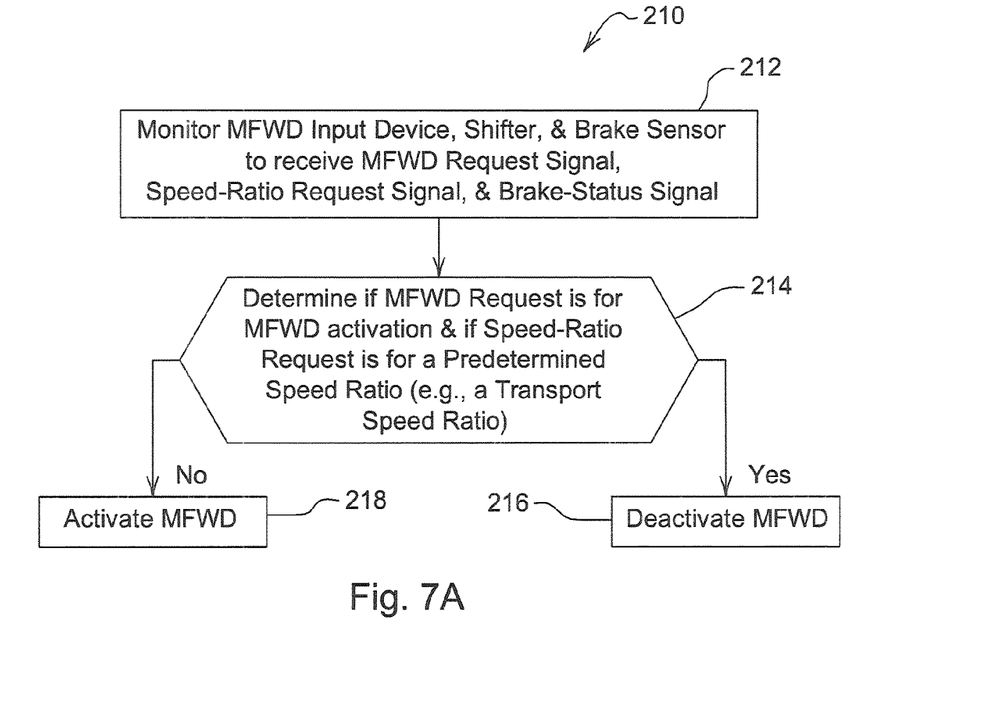
FIG. 7A is a simplified block diagram of another control scheme.

Referring back to FIG. 3 together with FIG. 7A, the control scheme 210 of FIG. 7A may be employed with the MFWD control system of FIG. 3. In act 212 of the control scheme 210, the controller unit 42 monitors output of the MFWD switch or other MFWD input device 16, a shifter 70, and brake sensors 72. As alluded to above, the MFWD input device 16 is operable to generate a MFWD request signal representative of a MFWD request for activation or deactivation of the MFWD 13. The shifter 70 is operable to generate a speed-ratio request signal representative of a speed-ratio request for a speed ratio among a plurality of speed ratios in which the work vehicle is capable of operating.

The electrical controller unit 42 communicates with the MFWD input device 16 and the shifter 70. In act 212, it receives the MFWD request signal and the speed-ratio request signal. Exemplarily, the FHC 56 monitors output of the MFWD input device 16 and the shifter 70 and receives the MFWD request signal the speed-ratio request signal. In act 214, the controller unit 42 (e.g., the FLC 58 thereof) determines if the MFWD request is for activation of the MFWD 13 using the MFWD request signal (e.g., MFWD switch 16 in momentary-ON position or maintain-ON position) and if the speed-ratio request is for a predetermined speed ratio of the plurality of speed ratios using the speed-ratio request signal.

If both conditions are met, in act 216, the controller unit 42 (e.g., the FLC 58 thereof) commands deactivation of the MFWD 13, thereby overriding the MFWD request for activation. If, for example, the requested speed-ratio is not the predetermined speed ratio, in act 218, the controller unit (e.g., the FLC 58 thereof) commands activation of the MFWD 13 by outputting the active-MFWD control signal to the electro-hydraulic valve 46.

Exemplarily, the work vehicle 10 is capable of operating in a plurality of speed ratios comprising at least one working speed ratio (e.g., first and second forward gears) and at least one transport speed ratio (e.g., third and fourth forward gears) higher than the at least one working speed ratio. The predetermined speed ratio may be a transport speed ratio of the at least one transport speed ratio. For example, it may be the fourth forward gear. In other words, if the controller unit 42 determines that there is a request for MFWD activation and the speed-ratio request is for a transport speed ratio of the at least one transport speed ratio, the controller unit 42 commands deactivation of the MFWD 13 in order to override the MFWD activation request.

Figure 7B:
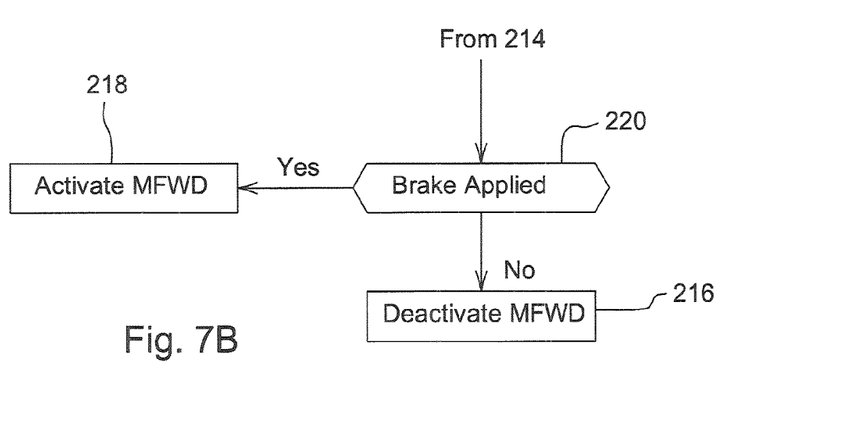
FIG. 7B is a simplified diagram of a possible modification to the control scheme of FIG. 7A.

Referring to FIGS. 3 and 7B, override of the MFWD activation request may be interrupted in instances when a brake 74 of the vehicle 10 is applied during, for example, operation of the vehicle in one of the transport speed ratios. In such a case, a brake sensor 76 (e.g., pressure switch) is configured for sensing application of a respective brake 74 and generating a brake-status signal in response thereto. The controller unit 42 (e.g., the FHC 58 thereof) monitors output of the brake sensors 76 and receives the brake-status signal therefrom (act 212). In act 220, the controller unit 42 (e.g., the FHC 58 thereof) determines also if no brake 74 is applied using the brake-status signal. If all three conditions are met (i.e., MFWD activation request present, request for predetermined speed ratio, and no brake applied), in act 216, the controller unit 42 (e.g., the FHC 58 thereof) commands deactivation of the MFWD. On the other hand, if either brake 74 is applied, in act 218, the controller unit 42 (e.g., the FHC 58 thereof) commands activation of the MFWD 13 by outputting the activate-MFWD control signal to the electro-hydraulic valve 46.

Figure 8:
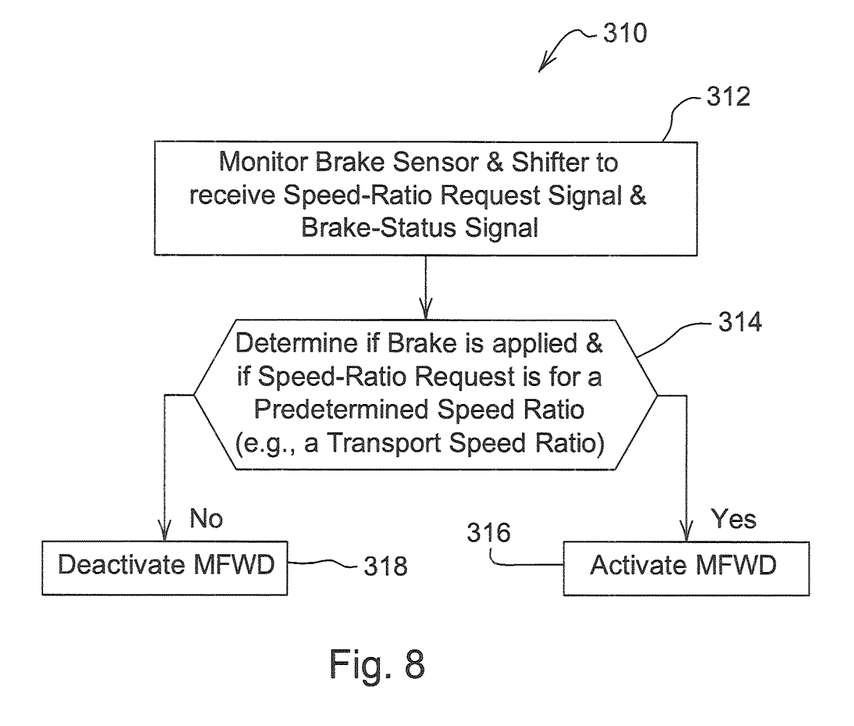
FIG. 8 is a simplified block diagram of yet another control scheme.

Referring to FIGS. 3 and 8, according to another control scheme 310, the work vehicle 10 may be configured to automatically activate the MFWD 13 when a brake 74 is applied depending on the speed ratio requested for the vehicle 10, regardless whether there is a separate request for MFWD activation by the MFWD input device 16. In such a case, the work vehicle 10 comprises the MFWD 13, a brake 74, a brake sensor 76 for sensing application of the brake and generating a brake-status signal in response thereto, the shifter 70, and an electrical controller unit that communicates with the brake sensor 76 and the shifter 70. In act 312, the electrical controller unit 42 (e.g., FHC 58 thereof) monitors output of the brake sensors 76 and the shifter 70 and receives the brake-status signal and the speed-ratio request signal.

In act 314, the controller unit 42 (e.g., FHC 58 thereof) determines if either brake 74 is applied using the brake-status signal and if the speed-ratio request is for a predetermined speed ratio of the plurality of speed ratios using the speed-ratio request signal. If both conditions are met, in act 316, the controller unit 42 (e.g., FHC 58 thereof) commands activation of the MFWD 13 by outputting the activate-MFWD control signal to the electro-hydraulic valve 46. If, for example, no brake 74 is applied, in act 318, the controller unit 42 (e.g., FHC 58 thereof) commands deactivation of the MFWD 13.

It is to be understood that the various signals disclosed herein may include not only times when the respective signal has a non-zero amplitude but also times when the respective signal may have a zero amplitude (i.e., OFF). The term "signal" thus applies to both situations.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method of operating a work vehicle, the work vehicle comprising a MFWD, the work vehicle operable in a plurality of speed ratios, the method comprising:
receiving a MFWD request signal representative of a MFWD request and a speed-ratio request signal representative of a speed-ratio request,
determining if the MFWD request is for activation of the MFWD using the MFWD request signal and, if so, commanding activation of the MFWD,
determining if the speed-ratio request is for a predetermined speed ratio of the plurality of speed ratios using the speed-ratio request signal, and, if so, commanding deactivation of the MFWD, thereby overriding the MFWD request for activation,
receiving a brake-status signal representative of whether a brake of the work vehicle is applied, and
determining if the brake is applied using the brake-status signal, and, if so, commanding re-activation of the MFWD, thereby interrupting the overriding.

2. The method of claim 1, wherein the work vehicle comprises a shifter positionable between different positions, and each position corresponds to a request for a respective speed ratio, comprising monitoring the position of the shifter for the speed-ratio request signal.

3. The method of claim 1, wherein the plurality of speed ratios comprise at least one working speed ratio and at least one transport speed ratio higher than the at least one working speed ratio, and the determining if the speed-ratio request is for the predetermined speed ratio comprises determining if the speed-ratio request is for a transport speed ratio of the at least one transport speed ratio.

4. The method of claim 3, wherein the plurality of speed ratios comprise first, second, third, and fourth forward gears, and the determining comprises determining if the speed-ratio request is for the fourth forward gear.

5. A work vehicle, comprising:
a MFWD,
a MFWD input device operable to generate a MFWD request signal representative of a MFWD request for activation or deactivation of the MFWD,
a brake and a brake sensor for sensing application of the brake and generating a brake-status signal in response thereto,
a shifter operable to generate a speed-ratio request signal representative of a speed-ratio request for a speed ratio among a plurality of speed ratios in which the work vehicle is capable of operating, and
an electrical controller unit that communicates with the MFWD input device, the brake sensor, and the shifter, the electrical controller unit adapted to:
receive the MFWD request signal and the speed-ratio request signal,
determine if the MFWD request is for activation of the MFWD using the MFWD request signal and, if so, command activation of the MFWD,
determine if the speed-ratio request is for a predetermined speed ratio of the plurality of speed ratios using the speed-ratio request signal, and, if so, command deactivation of the MFWD, thereby overriding the MFWD request for activation,
receive the brake-status signal, and
determine if the brake is applied using the brake-status signal, and, if so, command re-activation of the MFWD, thereby interrupting the overriding.

6. The work vehicle of claim 5, wherein the shifter is positionable between different positions, each position corresponds to a request for a respective speed ratio, and the controller unit is adapted to monitor the position of the shifter for the speed-ratio request signal.

7. The work vehicle of claim 5, wherein the plurality of speed ratios comprise at least one working speed ratio and at least one transport speed ratio higher than the at least one working speed ratio, and the electrical controller unit is adapted to determine if the speed-ratio request is for a transport speed ratio of the at least one transport speed ratio.

8. The work vehicle of claim 7, wherein the plurality of speed ratios comprise first, second, third, and fourth forward gears, and the controller unit is adapted to determine if the speed-ratio request is for the fourth forward gear.

* * * * *